US009995454B2

(12) United States Patent
Marcoux et al.

(10) Patent No.: US 9,995,454 B2
(45) Date of Patent: Jun. 12, 2018

(54) LENS FOR A LIGHT EMITTING DIODE

(71) Applicant: US LED Ltd., Houston, TX (US)

(72) Inventors: Eric Marcoux, Laval (CA); Gabriel Corbeil, Sainte Sophie (CA)

(73) Assignee: US LED, Ltd., Houston, TX (US)

( * ) Notice: Subject to any disclaimer, the term of this patent is extended or adjusted under 35 U.S.C. 154(b) by 0 days. days.

(21) Appl. No.: 15/135,417

(22) Filed: Apr. 21, 2016

(65) Prior Publication Data
US 2017/0307171 A1 Oct. 26, 2017

(51) Int. Cl.
F21V 1/00 (2006.01)
F21V 11/00 (2015.01)
F21V 5/04 (2006.01)
F21V 5/00 (2018.01)
F21K 99/00 (2016.01)
F21V 23/06 (2006.01)
F21Y 101/02 (2006.01)

(52) U.S. Cl.
CPC .............. F21V 5/04 (2013.01); F21K 9/30 (2013.01); F21V 5/008 (2013.01); F21V 23/06 (2013.01); F21Y 2101/02 (2013.01)

(58) Field of Classification Search
CPC . F21V 5/04; F21V 5/008; F21V 23/06; F21K 9/30; F21Y 2101/02
See application file for complete search history.

(56) References Cited

U.S. PATENT DOCUMENTS

| | | | | |
|---|---|---|---|---|
| 8,860,209 B1* | 10/2014 | Isaacson | ............... | H01L 23/373 257/712 |
| 2005/0151708 A1* | 7/2005 | Farmer | ..................... | G09F 9/33 345/82 |
| 2007/0121326 A1* | 5/2007 | Nall | ....................... | F21V 29/004 362/294 |
| 2011/0089453 A1* | 4/2011 | Min | ......................... | F21V 5/04 257/98 |
| 2015/0354780 A1* | 12/2015 | Wang | ...................... | G02B 3/08 362/294 |
| 2016/0076739 A1* | 3/2016 | Hsiao | ..................... | F21V 5/048 362/299 |
| 2016/0245479 A1* | 8/2016 | Wilcox | .................... | F21V 5/04 |
| 2017/0059093 A1* | 3/2017 | Tan | ....................... | F21K 9/1355 |

* cited by examiner

Primary Examiner — Donald Raleigh
(74) Attorney, Agent, or Firm — Blank Rome LLP

(57) ABSTRACT

A lens for a light-emitting diode (LED) provides an even light pattern over a desired throw of light. An indentation on the top of the lens and a lens collector on the bottom are configured for a desired spread angle of light refracted an LED positioned on a circuit board below the light collector of the lens. One or more lenses may be formed in a lens unit for assembly with a circuit boards and molding into an LED module. The module may be used in sign cabinet and other lighting applications where LEDs are used as light sources.

5 Claims, 9 Drawing Sheets

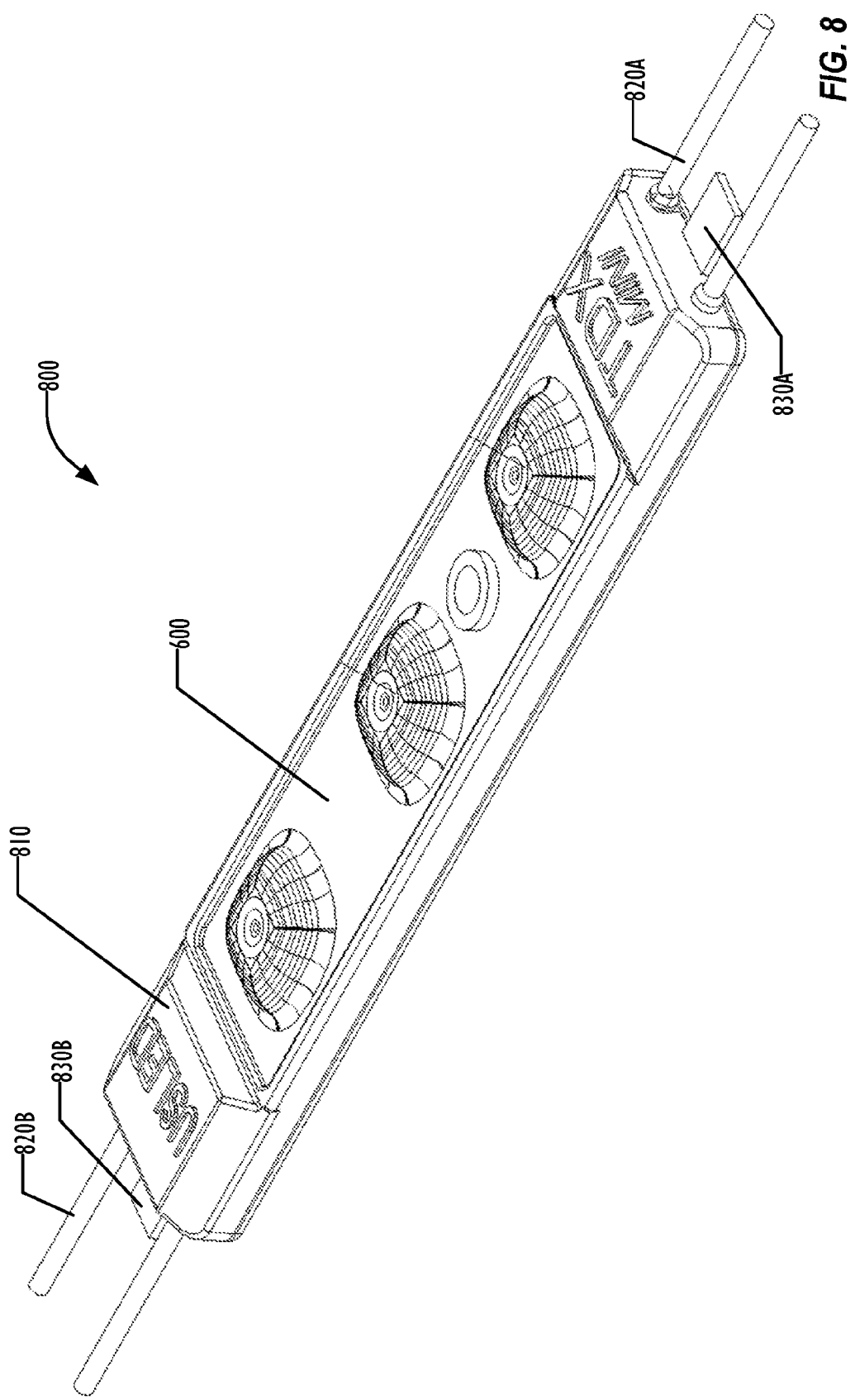

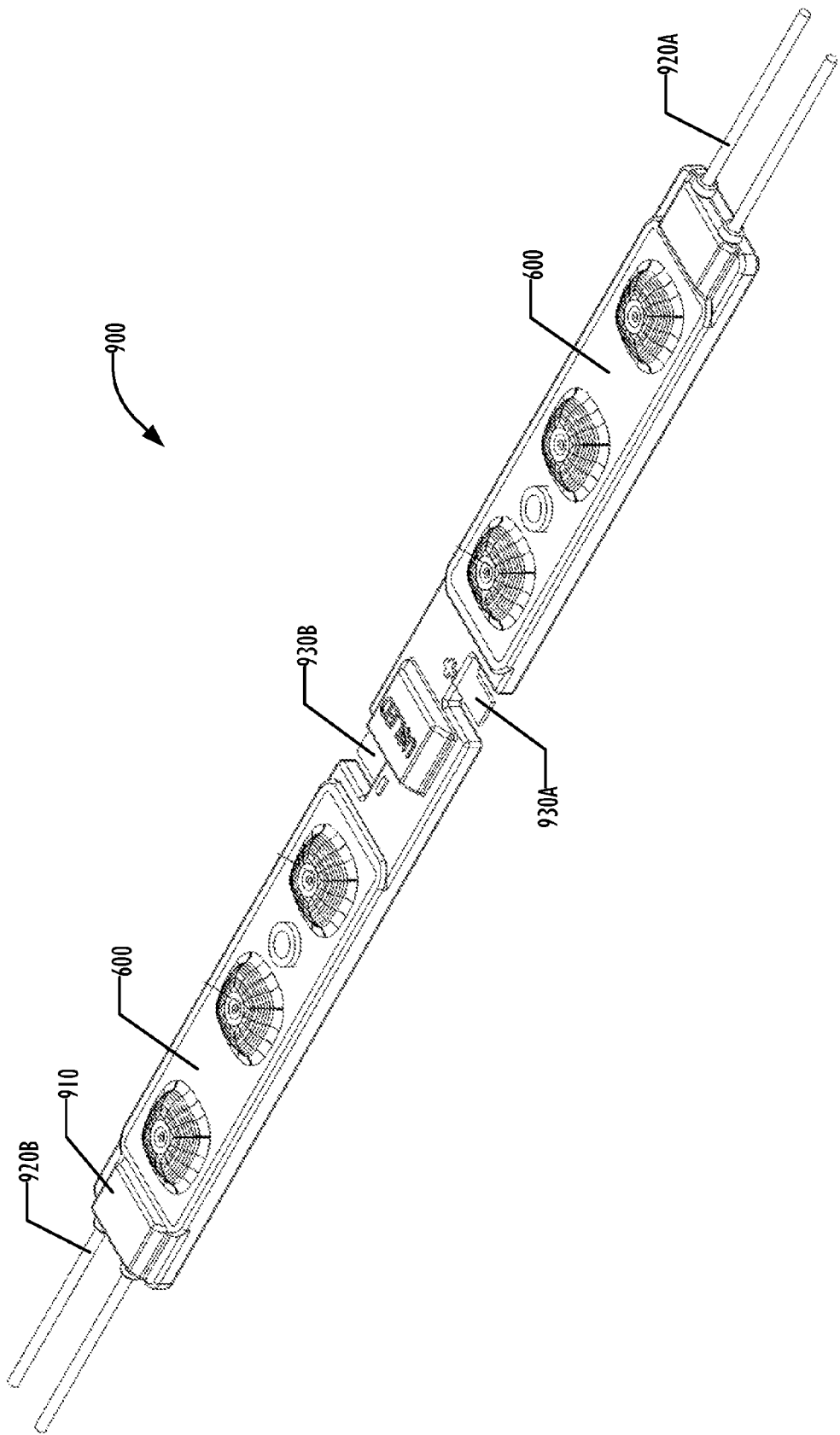

LENS FOR A LIGHT EMITTING DIODE

TECHNICAL FIELD

The present invention relates to the field of lighting, and in particular to a lens for use with a light-emitting diode (LED).

BACKGROUND ART

LEDs are typically assembled with a lens that may control or modify the light output and viewing angle of the LED. For example, in some applications, a narrow focus of light is desired, while in other applications a more diffuse, even light output is preferable. For example, in one common use for LED lights, a sign cabinet, even light output across the surface of the sign is typically preferable over a combination of brighter and darker areas. Lenses are commonly used to control light output and viewing angle of the LED.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

FIG. 8 is an upper perspective view of a 3-lens LED module incorporating the mounting base and lenses of FIGS. 6-7 according to one embodiment.

FIG. 9 is an upper perspective view of a 6-lens LED module incorporating the mounting base and lenses of FIGS. 6-7 according to one embodiment.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the terms "top" and "bottom" are arbitrary directions, with "top" generally referring to the portion of the lens distal from the LED and "bottom" generally referring to the portion of the lens proximal to the LED. Because in application the lens and LED may be oriented in any desired direction, no spatial direction is intended by the designation "top" or "bottom."

Figure 1:
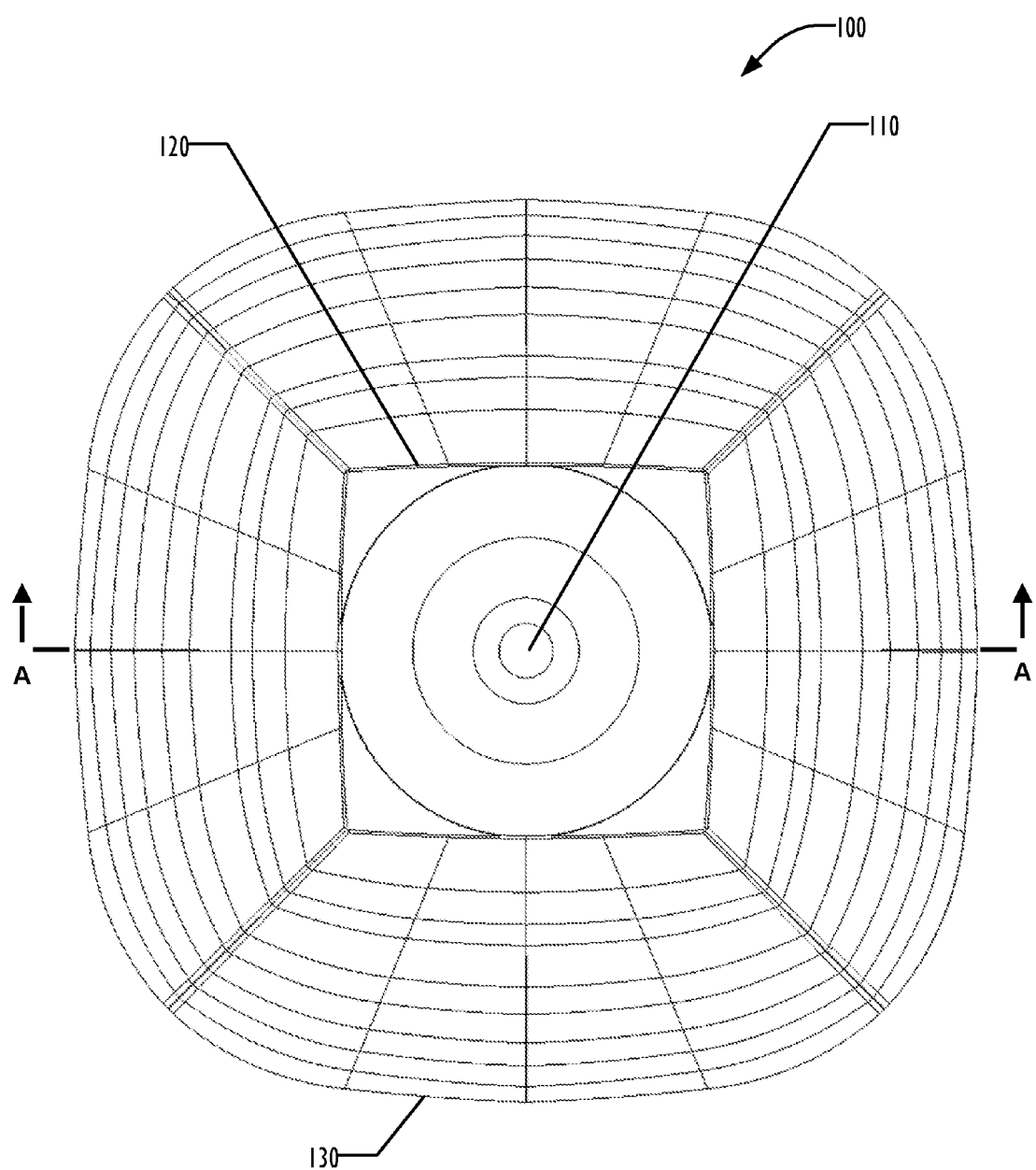
FIG. 1 is a top view of a lens for an LED according to one embodiment.

FIG. 1 is a top view of a lens 100 according to one embodiment. The body of the lens is made of a transparent or translucent material. In one embodiment, the lens is formed of an optical grade acrylic, such as a poly(methyl methacrylate) (PMMA). The lens may be injection molded or formed in any other desired or convenient process. When assembled with an LED, light from the LED passes through the lens 100 to form a desired spread angle and light pattern, preferably a substantially square pattern, with a peak output at approximately 70° off center, and no hotspots.

As illustrated in FIG. 1, the lens 100 has a substantially square shape, with rounded corners, rather than a spherical or semi-spherical configuration. An indentation 110 is formed in the central top portion of the lens 100. The indentation 110 also has substantially square sides 120 as it meets with the upper surface of the lens 100, with less rounded corners than the remainder of the lens 100. The indentation 110 has a circular shape as the indentation 110 extends below the upper surface, forming a conical surface. Light received from an LED illuminated below the lens 100 is refracted by the lens material to achieve the desired spread angle and pattern.

Figure 2:
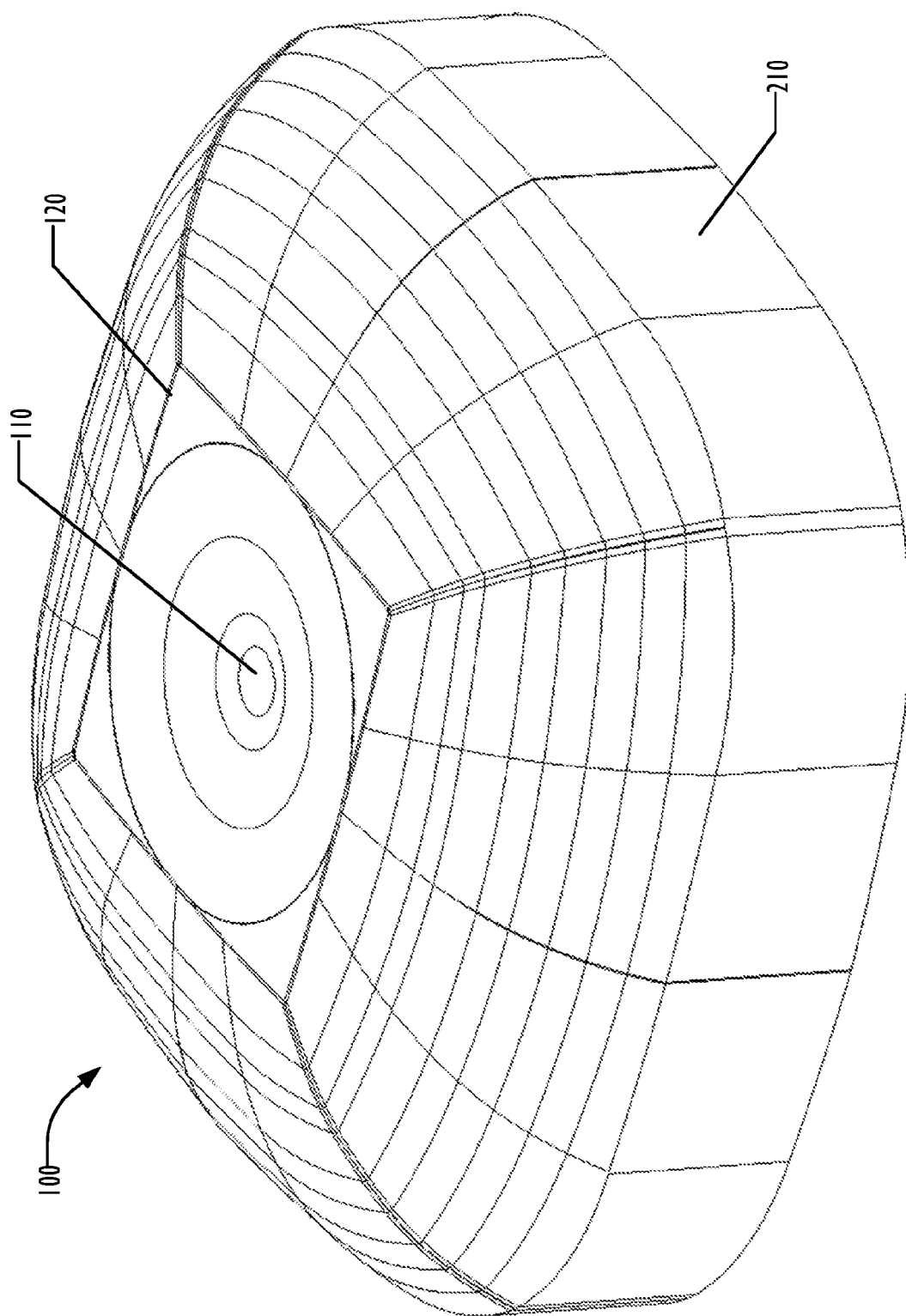
FIG. 2 is a top perspective view of the lens of FIG. 1.

FIG. 2 is an upper perspective view of the lens 100, showing side walls 210. In some embodiments, the lens 100 is embedded in a mounting base (not illustrated in FIG. 2; see FIGS. 6-7) that would surround sides 210.

In some embodiments, the upper surface 130, including the surface of the indentation 110 may be textured as desired for additional diffusion of the light refracted by the lens generated by the LED below the lens, and to eliminate prismatic effects caused by refraction of light through the lens 100. Manufacturers of acrylic lens have numerous standardly available textures and any desired standard texture or any desired custom texture may be used.

In one embodiment, the lens 100 is approximately ¾ inch by ¾ inch across, and rises approximately ⅛ inch above the top of the side wall 210 to the square sides 120 of the indentation 110. The flattened area 120 at the top of the lens 100 may be approximately ¼ in on a side. Other sizes may be used as desired, and the size of the lens 100 may depend upon the specific LED used.

Figure 3A:
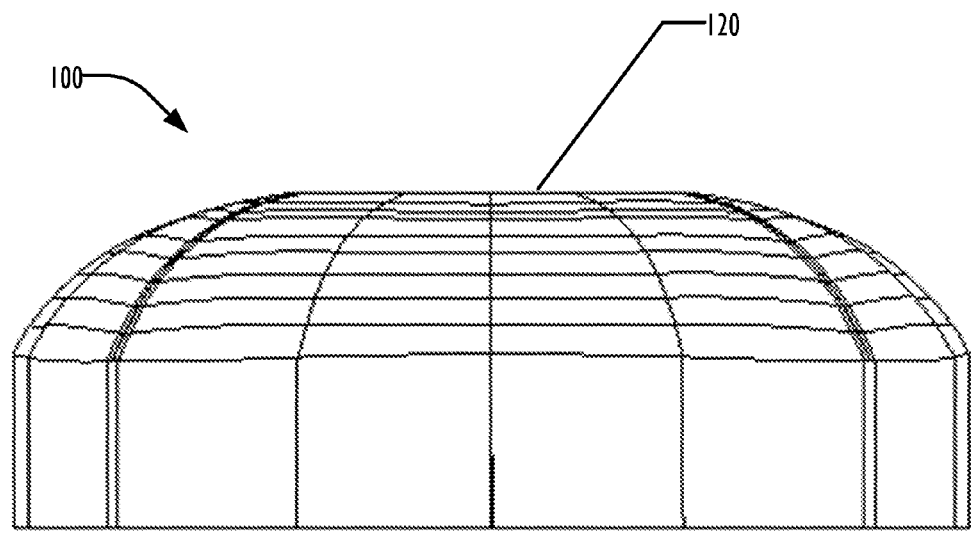
FIG. 3A is side view of the lens of FIG. 1.
Figure 3B:
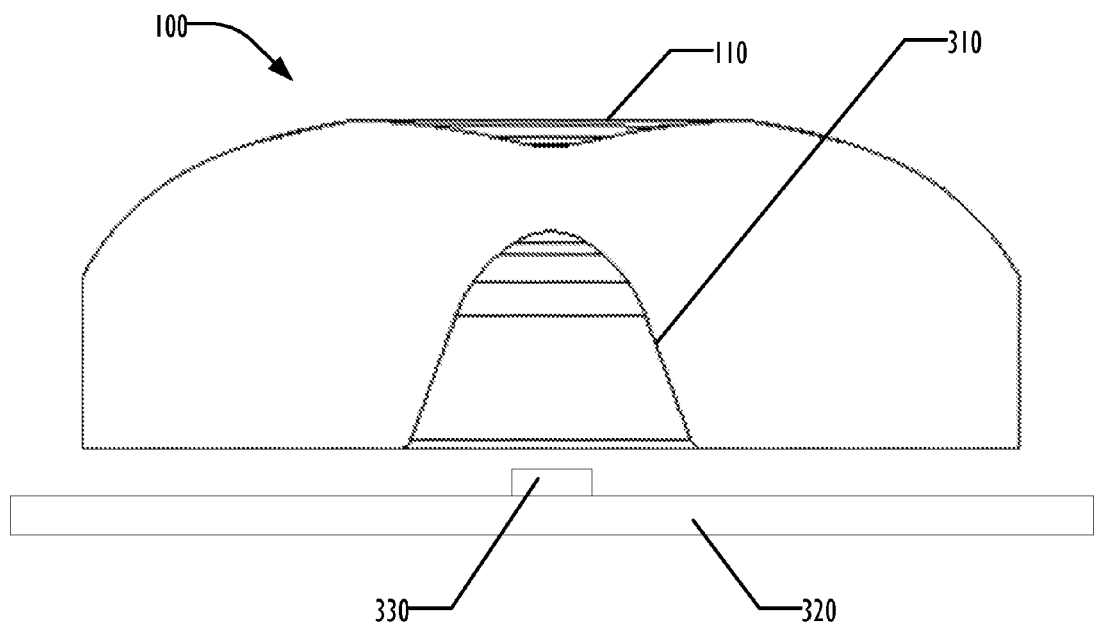
FIG. 3B is a side cutaway view of the lens of FIG. 1 along line A-A.

FIG. 3A is a side view of the lens 100 of FIG. 1, illustrating how area 120 flattens the top of the lens 100. FIG. 3B is a cross-sectional view of the lens 100 about line A-A. As illustrated in FIG. 3A, in addition to the indentation 110 on the top surface of the lens 100, a generally conical light collector opening 310 is formed in the bottom surface of the lens 100. When assembled, an LED 330 is positioned on a circuit board 320 so the LED 330 is centrally placed below the light collector 310. Light output from the LED 330 is collected and refracted through the body of the lens 100 to produce the desired light pattern.

Figure 4:
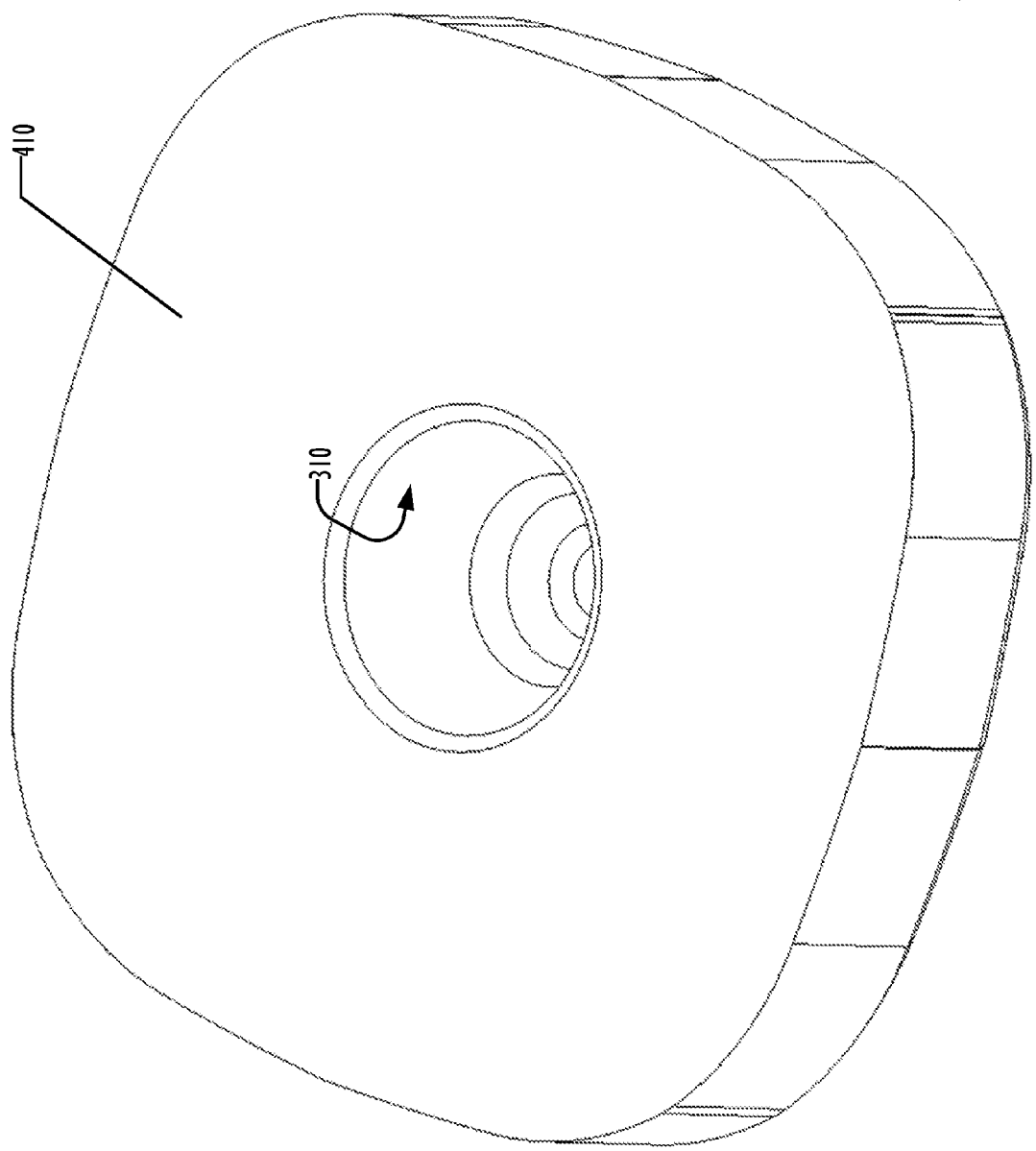
FIG. 4 is a bottom perspective view of the lens of FIG. 1

FIG. 4 is a lower perspective view of the lens 100 according to one embodiment. The bottom surface 410 of the lens 100 may also be textured to reduce prismatic effects, typically using the same texture as on the top surface, but in some embodiments using a different texture. The surface of the light collector opening 310 may also be textured, using the same or a different texturing as desired.

Figure 5:
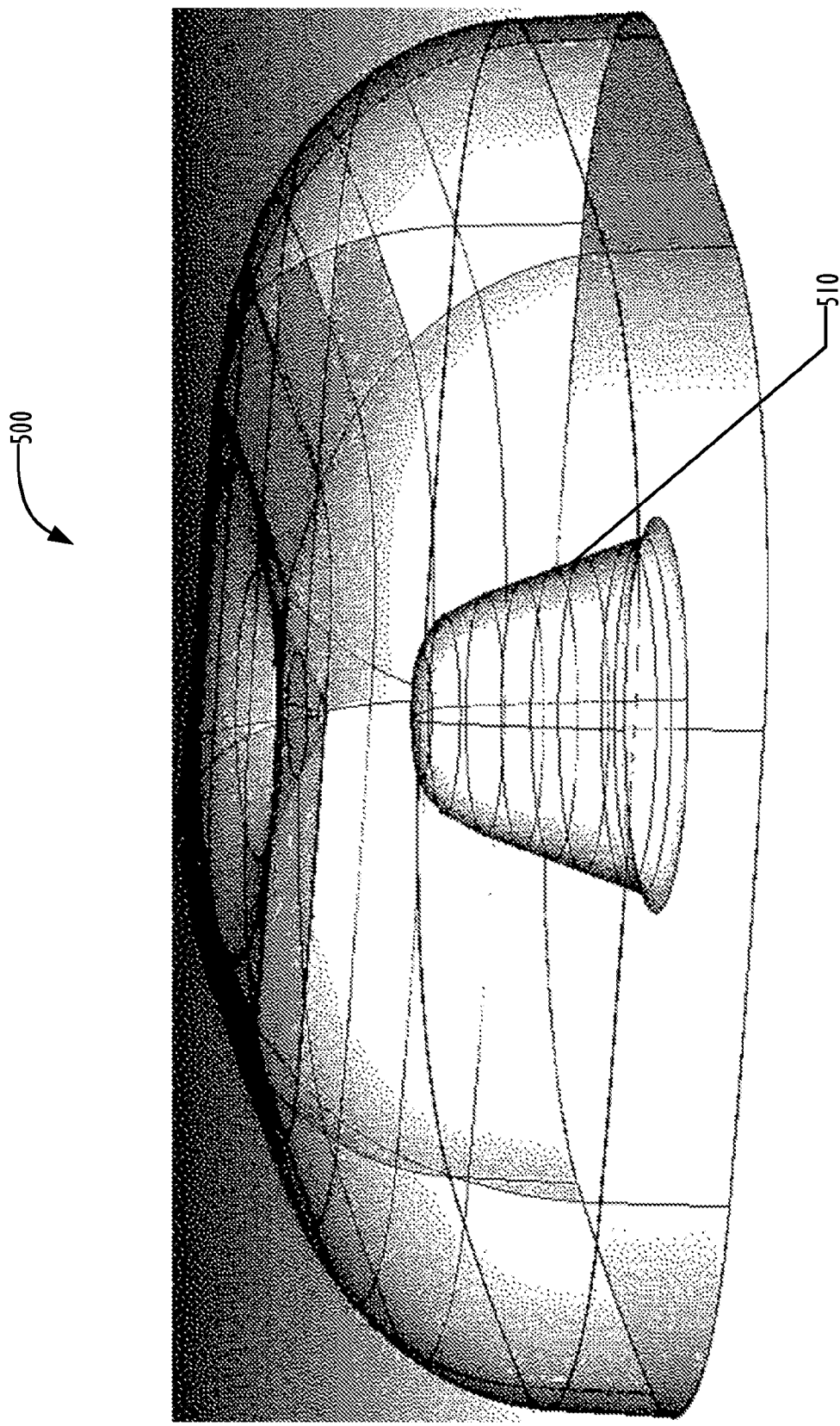
FIG. 5 is a side perspective view of a lens for an LED according to another embodiment.

FIG. 5 is a side perspective view of another embodiment of a lens 500, in which the light collector 510 has a more frusto-conical configuration than the than the light collector 310 of FIG. 3B.

Figure 6:
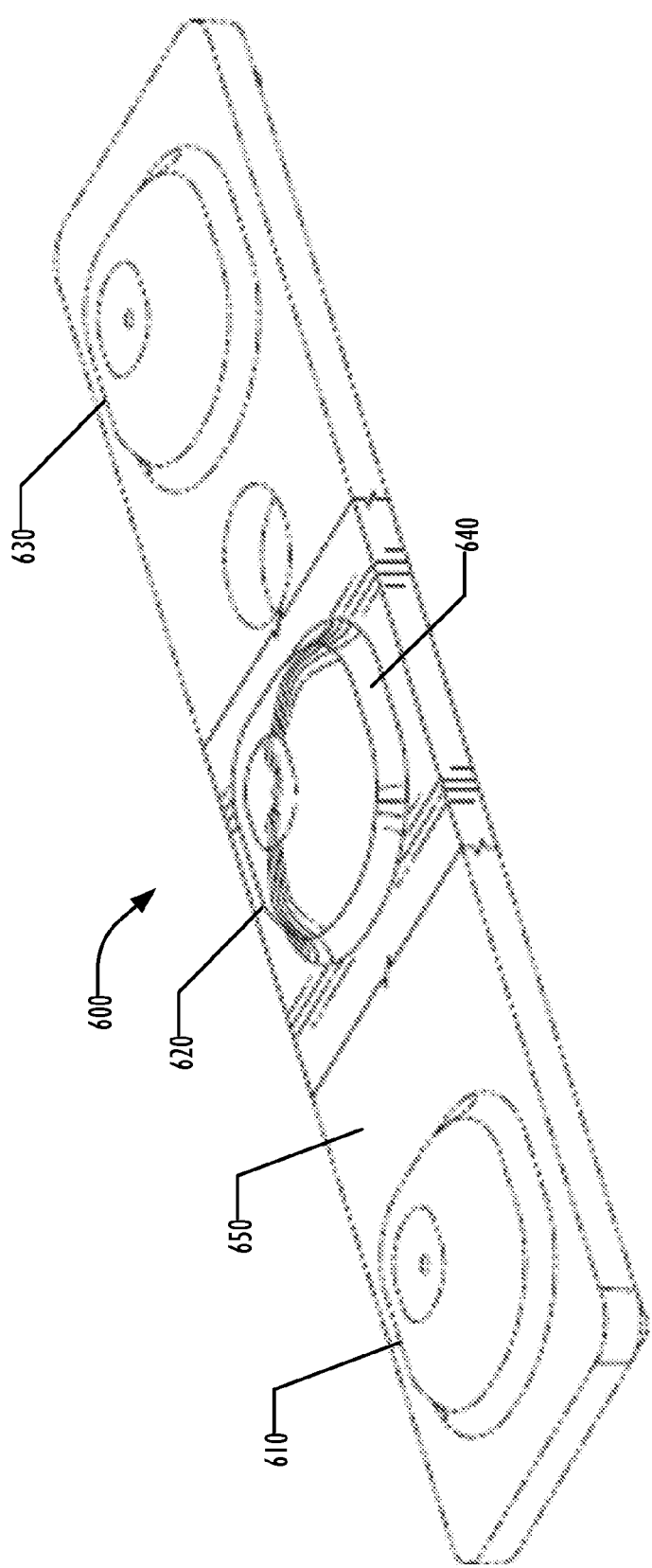
FIG. 6 is an upper perspective view of a mounting base with three LED lenses according to one embodiment, with two of the lenses shown in phantom.

FIG. 6 is an upper perspective view of a unit 600 containing three lenses 610, 620, and 630 mounted on a mounting base 650 according to one embodiment. The mounting base 650 holds the lenses 610, 620, and 630 spaced apart at a desired pitch for a desired light coverage. The mounting base 650 may be formed of the same material as the lenses 610, 620, and 630, or may be formed of a different material as desired. In some embodiments, the unit 600 is formed using injection molding in a single process. In other embodiments, the mounting base 650 may be formed separately from the lenses 610, 620, and 630 and then assembled with them. A shoulder 640 may be formed around at least a portion of the circumference of each lens 610, 620, and 630, as illustrated in FIG. 6. Although illustrated in FIG. 6 as a unit 600 of three lenses, units may be produced with any desired number of lenses, including a single lens.

Figure 7:
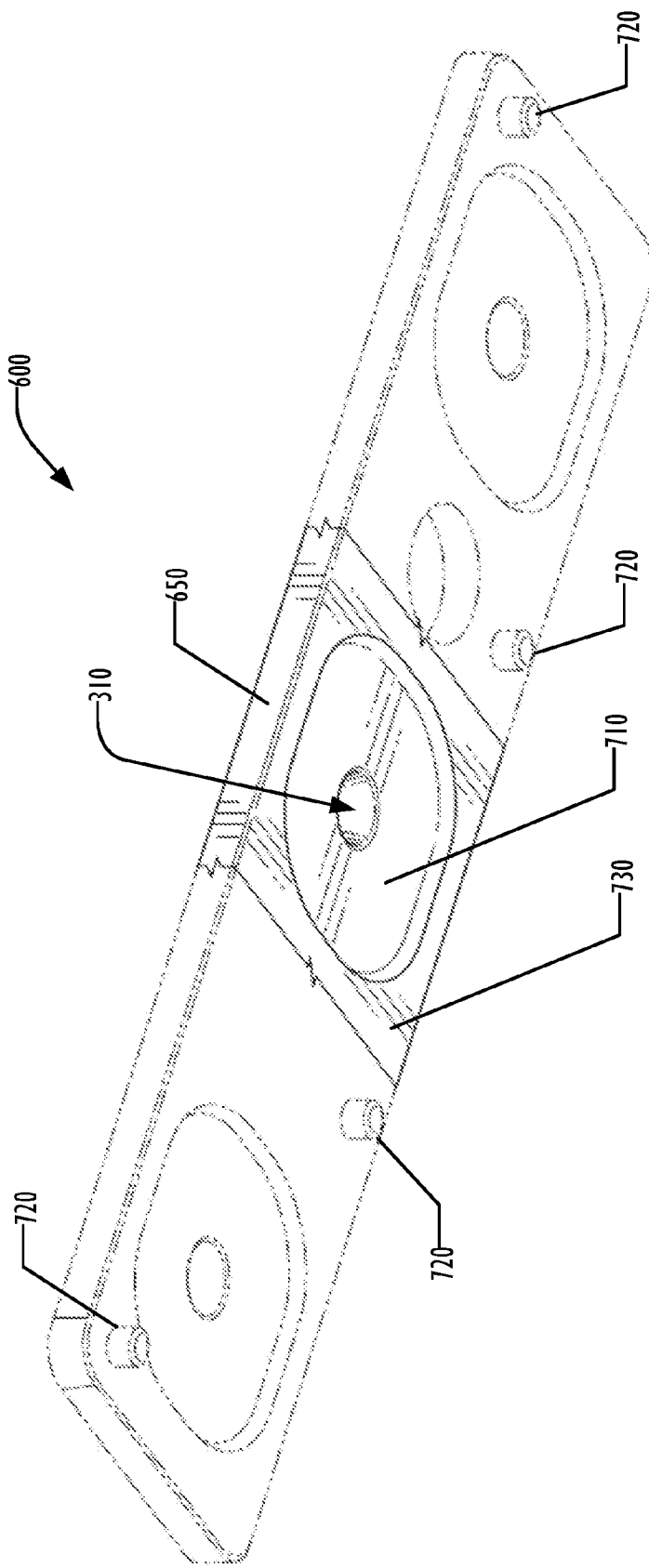
FIG. 7 is a lower perspective view of the mounting base of FIG. 6.

FIG. 7 is a lower perspective view of the unit 600 of FIG. 6. As illustrated in FIG. 7, the lower surface 710 of each lens may be offset from a lower surface 730 of the mounting base 650. In such a configuration, the size of the offset may be determined by the height of an LED that is to be placed below each lens, so that the LED is positioned in the space made by the offset lower surface 710 without extending into the light collector 310. One or more mounting posts 720 optionally may be formed in the lower surface 730 of the mounting base 650 for mounting the unit 600 to a substrate (not shown). If used, the mounting posts 720 may be positioned in any desired position on the mounting base 650, and although illustrated as circular in FIG. 7, may have any desired shape.

FIG. 8 is an upper perspective view of a lighting module 800 incorporating the three lens unit 600 of FIG. 6, according to one embodiment. As illustrated in FIG. 8, a molding 810 is formed about the unit 600 and a circuit board (not shown) containing three LEDs, positioned under each lens of the unit 600. The molding 810 is typically assembled by overmolding the unit 600 and circuit board, but may use a snap-on or other assembly technique as desired. In the embodiment illustrated in FIG. 8, the lighting module 800 includes connector wires 820A and 820B for electrical connections to each end of the lighting module 800. Quick-connect tabs 830A and 830B may also be provided for additional electrical connections.

FIG. 9 is an upper perspective view of a lighting module 900 incorporating two of the three lens units 600 of FIG. 6, according to one embodiment. As illustrated in FIG. 9, molding 910 is formed over the two lens units 600 and circuit boards (not shown) spaced apart by a central section that contains a positive quick-connect connector 930A and a negative quick-connect connector 930B. Although shown as spade terminals, other types of connectors 930A, 930B may be used as desired. In addition, connector wires 920A and 920B are positioned at both ends of the module 900. As with the module 800 of FIG. 8, the module 900 is typically assembled by overmolding the lens units 600 and circuit boards, but other assembly techniques such as snap-on moldings may be used as desired.

Although illustrated in FIG. 9 with two three lens units 600, the module 900 in other embodiments may be assembled using a single six lens unit 600 or other numbers of lens units with differing numbers of lenses, such as six single lens units. In addition, other lighting modules may have other numbers of lenses, including a single lens module.

In a backlit sign cabinet application, lighting modules such as the lighting module 800 or lighting module 900, may be mounted on mounting members, such as a strip of aluminum extrusion, or may be mounted individually to the sign cabinet. Different configurations of lighting modules may be used in an application, to fit the application. The modules are not limited to sign cabinet applications, but may be used in other applications as desired.

While certain exemplary embodiments have been described in details and shown in the accompanying drawings, it is to be understood that such embodiments are merely illustrative of and not devised without departing from the basic scope thereof, which is determined by the claims that follow.

We claim:

1. A light-emitting diode lighting module, comprising:
   a lens unit, comprising:
      a mounting base; and
      one or more lenses, each comprising:
         a substantially square body of a transparent material;
         an indentation formed in a top surface of the body; and
         a light collector indentation formed in a bottom surface of the body;
   a circuit board, on which one or more light-emitting diodes are positioned, the circuit board positioned so that each of the one or more light-emitting diodes are positioned centrally below the light collector indentation of each of the one or more lenses;
   a molding surrounding the lens unit and circuit board, holding the lens unit and circuit board in place;
   a plurality of wires electrically connected to the circuit board; and
   a pair of rigid quick-connectors electrically and integrally connected to the circuit board, positioned on both sides or both ends of the circuit board.

2. The light-emitting diode lighting module of claim 1, comprising a plurality of lens units and a corresponding plurality of circuit boards.

3. The light-emitting diode lighting module of claim 1, wherein the pair of quick-connect connectors are positioned centrally on either side of the light-emitting diode lighting module.

4. The light-emitting diode lighting module of claim 1, wherein the molding comprises an overmolded molding.

5. The light-emitting diode lighting module of claim 1, wherein light refracted from each of the one or more lenses has a substantially square pattern with a peak output at approximately 70° off center.

* * * * *